United States Patent [19]

Schmid

[11] Patent Number: 4,616,386
[45] Date of Patent: Oct. 14, 1986

[54] APPARATUS FOR CUTTING AND PREPARING CABLES

[75] Inventor: Hans Schmid, Langnau, Switzerland

[73] Assignee: Megomat AG, Rüschlikon, Switzerland

[21] Appl. No.: 666,290

[22] Filed: Oct. 29, 1984

[30] Foreign Application Priority Data

Nov. 7, 1983 [CH] Switzerland ............. 5986/83

[51] Int. Cl.⁴ ............. H01R 43/00; H02G 1/12
[52] U.S. Cl. ............. 29/33 M; 29/564.4; 29/759; 74/526; 414/738
[58] Field of Search ............. 29/33 M, 564.4, 748, 29/753, 754, 759; 74/105, 526, 565; 414/225, 720, 738

[56] References Cited

U.S. PATENT DOCUMENTS 2,954,599 10/1960 Cootes et al. ............. 29/33 M
4,506,566 3/1985 Schmid .

Primary Examiner—Z. R. Bilinsky
Attorney, Agent, or Firm—Benoit Law Corporation

[57] ABSTRACT

Apparatus for cutting and preparing cables use a grip head having a cable gripping device which is swingable by a drive between end positions delimited by a shock absorber and which is mounted on one end on a shaft rotatable about an axis extending rectangularly to a cable run. A force-transmitting element is coupled to be swingable with the grip head in spaced relationship to the mentioned axis, and a link is disposed between the force-transmitting element and the shock absorber. The force-transmitting element is positionable in a mid-position between end positions thereof opposite to the shock absorber and on a line intersecting the mentioned axis at right angles. The force-transmitting element may be arranged on a drive power link which is mounted on the same end of the shaft as the grip head.

12 Claims, 3 Drawing Figures

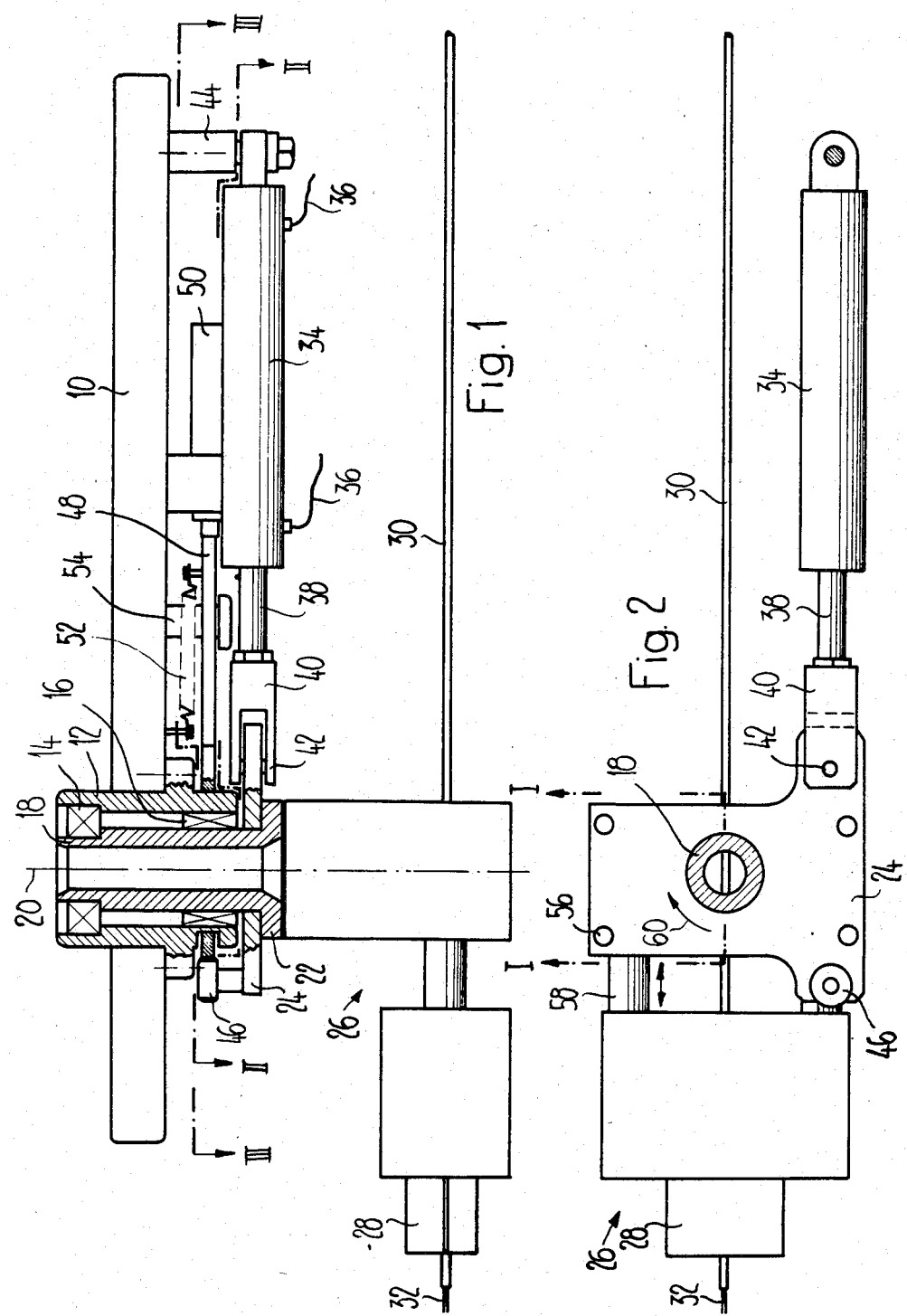

APPARATUS FOR CUTTING AND PREPARING CABLES

BACKGROUND OF THE INVENTION

The subject invention relates to cable handling machinery and, more particularly, to apparatus for finishing, dressing or for cutting and preparing cables.

Such apparatus serves in particular for the automatic cutting and preparing of single cored insulated cables or wires whereby the machine cuts the cables or wires to a adjustable length, strips the insulation at the ends and outfits them with terminals or other connectors. Whereas the cutting and stripping takes place on the inside of the machine on a straight lined cable run, it is necessary to feed the cable ends to be provided with equipment to outfitting facilities located outside of the cable run. This task is carried out by turnable grip heads which are moved by means of activating elements, usually by means of piston-cylinder units. The swinging in and out motions have to take place very quickly in order to attain an efficient working mode for such relatively expensive machines.

Known apparatus of this type are provided with two shock absorbers whereby each one of them is assigned to an end position. Although these shock absorbers are damping the impact onto the stops defining the end positions, nevertheless impact noise is generated when the movable parts of the shock absorbers are hit. Such impact noises essentially depend on the velocity of the swinging motions and from the mass of the parts to be decelerated.

With machines of known construction both shaft ends protrude from a guide provided with bearings whereby one shaft end is provided with the grip head and the other with a lever where the activating element engages. Such an embodiment represent a relatively large mass to be accelerated and decelerated.

SUMMARY OF THE INVENTION

It is an object of this invention to provide apparatus or machinery of the above mentioned type which works silently and in particular avoids impact noises in a simple manner reducing the mass of the parts to be swung about.

The subject invention resides in apparatus for cutting and preparing cables with a grip head having a cable gripping device swingable by a drive between end positions delimited by shock absorbing means and being mounted on one end on a shaft rotatable about an axis extending rectangularly to a cable run. In this respect, the invention comprises, in combination, a force-transmitting or transfer element coupled to be swingable with the grip head in spaced relationship to said axis, a link between that force-transmitting element and shock absorbing means, and means for positioning the force-transmitting element in a mid-position between end positions thereof opposite to the shock absorbing means on a line intersecting said axis at right angles.

In a preferred embodiment of the invention, the force-transmitting or transfer element describes a circular arc defined by the end positions of the swing and having in a mid-position either the smallest or greatest distance from the movable part of the shock absorber, depending on the arrangement of parts. Such a solution permits a constant operative connection between the force-transmitting element and the shock absorber to the extent that impact noises from violently meeting parts are avoided. Even a brief interruption of the operative connection in the middle position does not permit the occurence of impact noises because the relative velocity, with reference to the shock absorbers, goes through zero in this range and is thus very small.

It is an essential feature of the solution according to the invention that only one shock absorber is neceesary for both end positions.

According to another embodiment of the invention, the point of engagement of the drive element or link is situated immediately next to the grip head to be swung around. An activating lever on the other end of the shaft is superflous and the shaft does not need to transfer any torque. Therefore, in comparison to known embodiments, the mass to be swung about is largely reduced. The consequence is either a reduced need of driving power or force or greater acceleration during the swinging operation. Especially at greater acceleration, the solution herein disclosed is particularly advantageous in achieving a noiseless deceleration.

Preferred features herein disclosed result in a further reduction of mass whereby the above mentioned link is either performing an additional function or is part of the grip head.

The force-transmitting element preferably includes a roller. In order to guarantee an uninterrupted operative connection, that roller preferably is continously in contact with a rolling surface, when transmitting the damping force or effect.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 1 is a partial view of a cable cutting and preparing apparatus according to a preferred embodiment of the invention with a turnable grip head in side view, partially in cross section according to the section line I—I of FIGS. 2 and 3;

FIG. 2 is a plan view of parts of the apparatus of FIG. 1 along the section line II—II in FIG. 1.

DESCRIPTION OF THE PREFERRED EMBODIMENT

Figure 3:
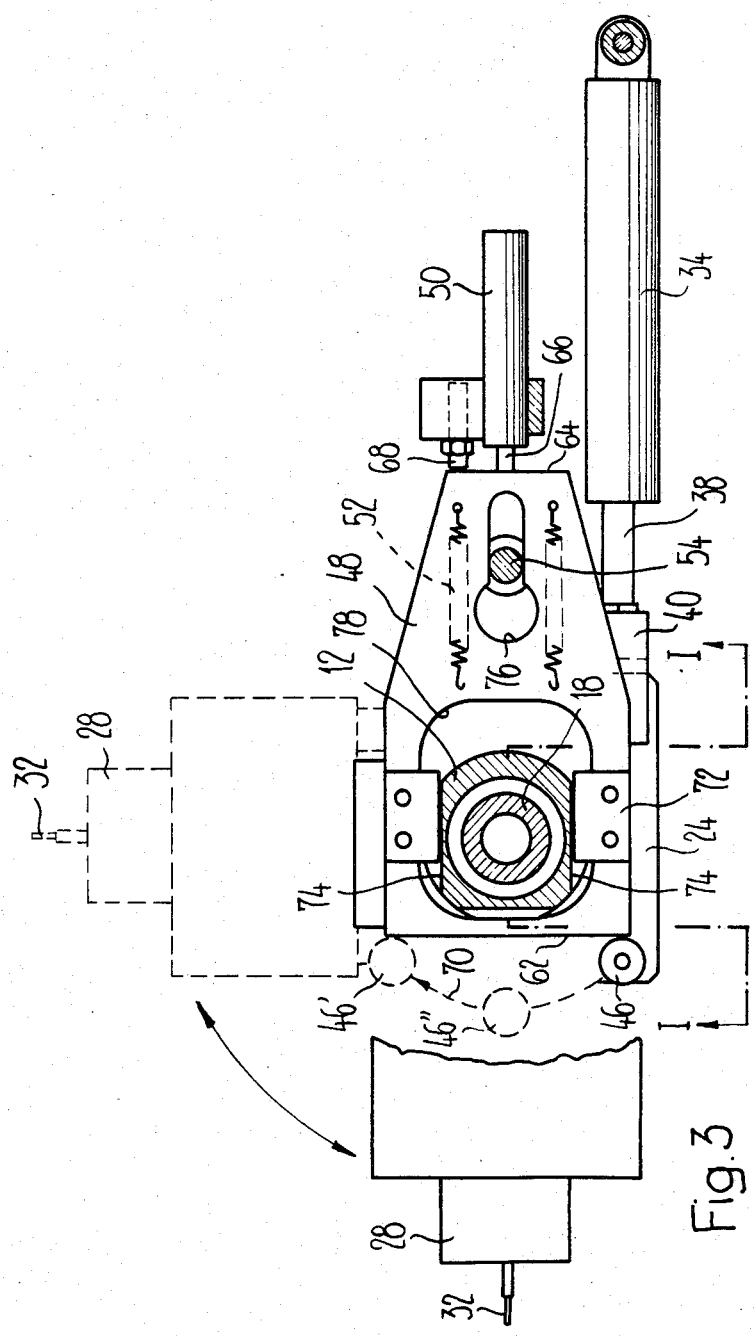
FIG. 3 is a plan view of parts of the apparatus of FIG. 1 along the section line III—III in FIG. 1.

According to FIG. 1 the only partially shown apparatus for the cutting and preparing of cables is provided with a base plate 10 into which a flanged bearing bushing 12 is inserted. A hollow or tubular shaft 18 which is turnable around a rotational axis 20 is supported by means of a ball bearing 14 and a needle bearing 16 in this bearing bushing 12. The lower protruding end of the hollow shaft 18 is provided with a flange 22 onto which a drive power link 24 in form of a plate is fastened. With the connecting link 24 there is connected a grip head 26 which is provided with a gripping device 28 to be activated for the purpose of gripping the cable 30 to be cut and prepared.

In order to illustrate the cutting and preparation process, the end 32 of the cable 30 is shown as already stripped of insulating material. Elements not shown in the drawing, of the apparatus for the cutting and preparing cables, have already cut the previous piece of cable and stripped the following end 32 of insulating material. It is now necessary to feed the cable end 32 to outfitting machinery not presented in the drawings outside of the cable run defined by the cable 30. Such outfitting machinery may, for instance, serve to press a cable shoe or terminal onto the cable end 32. The feeding to the outfitting equipment is effected by swinging the grip head 26 around the rotational axis 20. The angle of traverse of that swinging motion is usually 90°.

The swinging motion is effected by a drive element 34 which may, for instance, be a pneumatically driven, double effective piston-cylinder unit. This unit 34 is alternatingly acted upon by means of compressed air hoses 36. Valves, preferably arranged on the base plate 10, but not shown here, serve the control of the apparatus.

A piston rod 38 of the activating element 34 is connected to a fork 40 which preferably engages the connecting plate 24 via a spheric joint 42. The activating element 34 is stationary, but flexibly braced to the base plate 10 by means of a fastening link 44.

A force-transmitting or transfer element, which may be in the form of a roller 46, is coupled to be swingable with the grip head 26 in spaced relationship to the axis 20. Opposite in longitudinal direction from the activating element 34, the roller 46 is rotatably mounted on the drive power link or plate 24. The roller 46 is serving as a transfer or force-transmitting element and is in operative connection via connecting link 48 with a shock absorber 50 that is attached to the base plate 10. The connecting link 48 is thus located between the force-transmitting element and the shock absorber 50. The apparatus includes at least one spring for biasing the link or plate 48 against the roller 46. In the illustrated apparatus, the link 48 is biased in the direction of the roller 46 by means of two traction springs 52 arranged parallel to each other and engaging the base plate 10. Connecting link 48 is in the shape of a plate and guided as to height by a pin 54 and movable along a line rectangularly intersecting the axis of rotation 20 and having a rolling surface 62 at the roller 46 arranged perpendicularly to a direction of movement of that plate 48.

In FIG. 2 the shape of the connecting plate 24 serving as connecting link can be particularly well seen. Furthermore, it is apparent from this figure that the drive element 34 engages the connecting plate 24 in a line parallel to the cable run as defined by the cable 30 and that the roller 46 is also arranged on this line. The grip head 26 is connected to the drive power plate 24 at connecting points 56 and is thus connected to the shaft 18 by means of the drive power link. The gripping device 28 is movable relative to the grip head 26 by means of two rods 58. An arrow 60 indicates the swing motion of the grip head 26, with the gripping device 28 being, of course, swung along.

FIG. 3 is a plan view according to section line III—III of FIG. 1. In FIG. 3 the connecting link 48 in the shape of the sliding plate is apparent. The sliding plate 48 is provided on its frontal side with the rolling surface 62 where the roller 46 arranged on the sliding plate 24 rolls when the grip head 26 is swung by the activating element 34. The frontal side 64 of the sliding plate 48 opposite to the rolling surface 62 engages the movable pushing rod 66 of the shock absorber 50. The sliding plate 48 thus forms the operative connection between the roller 46 which serves as a transfer element and the shock absorber 50. An adjustable limit stop screw 68 engaging on the frontal side 64 limits the sliding path of the sliding plate 48 and thus the traverse angle of the grip head 26 in both end positions.

A dotted arrow 70 indicates the circular arc described by the roller 46 when the grip head 26 is swung by means of the drive element 34 from one end position to the other. In that other end position the roller takes a position 46'. In the middle position 46" between its end positions the roller is situated opposite the shock absorber 50 on a line rectangularly intersecting the axis of rotation 20. The shock absorber is also located on that line intersecting the axis 20 at right angles. Since the sliding plate 48 is biased by means of the two traction springs 52 in the direction of the roller 46, a continous contact of the rolling surface 62 with the roller 46 is guaranteed. It is apparent from the path 70 of the roller 46 that the direction of motion of the sliding plate 48 reverses when the roller 46 exceeds its middle position 46".

Although the sliding plate 48 in the illustrated embodiment is movable parallel to the cable run defined by the cable 30, this parallelity is not a condition. It is equally possible to arrange the displacement direction of the sliding plate 48 in an angle to the cable run 30.

Whereas it is a requirement that the middle position 46" of the roller 46 is located on the above mentioned line, it is not required that the shock absorber also is located on that same line. Rather, it may be laterally displaced, such as the final stop screw 68. It is only important that the direction of effectiveness of the shock absorber 50 is parallel to the cited line.

It is furthermore apparent from FIG. 3, that the sliding plate 48 is guided parallel by means of synthetic or plastic guiding parts 72 attached to it on surfaces 74 of the bearing bushing 12. The guide pin 54 serves as an additional guide wherefore it reaches through a keyhole shaped opening 76 in the sliding plate 48.

A symmetrical arrangement of the sliding plate 48 is possible by means of an opening 78 in the sliding plate 48 through which the the bearing bushing 12 and the tubular shaft 18 extend.

Although in the illustrated embodiment, in particular according to FIGS. 1 and 2, the connecting plate 24 which serves as a connecting link is connected on one hand with the tubular shaft 18 and carries the grip head 26 on the other hand, it is also possible to form such a connecting link which effects the connection of the grip head 26 with the drive 34 on the one hand and with the shock absorber 50 on the other hand, as a part of or integral with the grip head 26.

The embodiment shown in FIG. 1 has the particular advantage that the engagement level of the drive element 34 on the tubular shaft 18 borders directly on the bearing bushing 12. With such an arrangement the stress imposed on the bearings 14 and 16 and the shaft 18 is less than with an arrangement in which the engagement level is axially spaced from the bearing bushing 12. The essential advantage, however, resides in the fact that the shaft 18 does not have to transfer a tortional moment, since the engagement level, that is the plane of activation, coincides with the level where the grip head 26 is attached. Such an embodiment according to the invention thus contributes to the reduction of mass since only one end of the shaft is loaded, whereby the shaft may be relatively short and a separate driving lever is not required for connection to the the drive element. Due to the comparatively smaller mass that has to be moved for the swinging motion, a faster swing and/or a saving in driving effort is possible. When decelerating, the comparatively smaller mass also has a positive effect on noise reduction.

By way of summary, a grip head 26 with a gripping device 28 for the holding of the end of a cable 30 which, for instance is to be equipped with a cable terminal, is turnable around an axis of rotation 20 by means of a tubular shaft 18 which is rotated by a double effective piston-cylinder unit 34, that engages a drive power link 24 connected to the shaft 18 by a joint 42. The drive power link 24 supports the grip head 26 and is furthermore provided with a roller 46 in order to establish an operative connection with a shock absorber 50. The shock absorber 50 is effective in both end positions of the swivelling area of the grip head 26 because the roller 46 rolls on a rolling surface provided on the drive power link 24, thereby rolling over the reversal point located in the middle of the swivelling area. The arrangement of the drive plane, as defined by the drive 34, and the grip head 26 on the same shaft end 22, enables a saving of material for the reduction of mass of the parts to be rotated or swung. This, in turn, enables a reduction in noise. Mainly impact noises are avoided because the operative connection between the drive power link 24 and the shock absorber 50 is not only extant in the end positions but also is already effective before the shock absorber 50 becomes actually operative.

In the embodiment according to the invention, not only the point of engagement of the activating element 34 is located in a plane immediately bordering the bearing bushing 12, but also the connection with the shock absorber 50, which is formed by the roller 46 that is also arranged on the connecting plate 24.

The solution according to the invention of an operative connection between the connecting plate 24 and the shock absorber 50 which is clearly apparent in FIG. 3 is particularly advantageous. The surprising aspect of this solution lies in the fact that a single shock absorber is sufficient for absorbing the shock in both end positions.

Furthermore the arrangement according to the invention shows a remarkable side effect, in that the grip head 26 takes an advantageous position for the operator when the apparatus is turned off, and that is when the double effective drive element 34 is without pressure, since the connecting plate 24, biased by the two traction springs 52, is then swung to its middle position.

The above cited advantages of the solutions according to the invention gain in importance if it is kept in mind that this apparatus for the cutting and preparing of cables is a machine of high capacity where every reduction in mass leads to an increase of productivity.

What I claim is:

1. In apparatus for preparing cables including a grip head having a cable gripping device swingable by a drive between end positions delimited by shock absorbing means and being mounted on one end on a shaft rotatable about an axis extending rectangularly to a cable run,
    the improvement comprising in combination:
    a force-transmitting element coupled to be swingable with said grip head in spaced relationship to said axis;
    a link between said force-transmitting element and said shock absorbing means; and
    means for positioning said force-transmitting element in a mid-position between end positions thereof opposite to said shock absorbing means and on a line intersecting said axis at right angles.

2. Apparatus according to claim 1, wherein:
    said force-transmitting element is arranged on a drive power link which is mounted on the same end of said shaft as the grip head; and
    said drive is relatively stationary and coupled to said drive power link.

3. Apparatus according to claim 2, wherein:
    said grip head is also connected to said shaft by means of said drive power link.

4. Apparatus according to claim 3, wherein:
    said link is integral with said grip head 5. Apparatus according to claim 1, wherein:
    said force-transmitting element includes a roller;
    said link includes a plate movable along a line rectangularly intersecting said axis and has a rolling surface at said roller arranged perpendicularly to a direction of movement of said plate; and
    said apparatus includes at least one spring for biasing said plate towards said roller.

6. Apparatus according to claim 5, wherein:
    said plate has a frontal side located opposite to said rolling surface and engaging a movable part of said shock absorbing means.

7. Apparatus according to claim 2, wherein:
    said force-transmitting element includes a roller;
    said link includes a plate movable along a line rectangularly intersecting said axis and has a rolling surface at said roller arranged perpendicularly to a direction of movement of said plate; and
    said apparatus includes at least one spring for biasing said plate toward said roller.

8. Apparatus according to claim 7, wherein:
    said plate has a frontal side located opposite to said rolling surface and engaging a movable part of said shock absorbing means.

9. Apparatus according to claim 3, wherein:
    said force-transmitting element includes a roller;
    said link includes a plate movable along a line rectangularly intersecting said axis and has a rolling surface at said roller arranged perpendicularly to a direction of movement of said plate; and
    said apparatus includes at least one spring for biasing said plate toward said roller.

10. Apparatus according to claim 9, wherein:
    said plate has a frontal side located opposite to said rolling surface and engaging a movable part of said shock absorbing means.

11. Apparatus according to claim 4, wherein:
    said force-transmitting element includes a roller;
    said link includes a plate movable along a line rectangularly intersecting said axis and has a rolling surface at said roller arranged perpendicularly to a direction of movement of said plate; and
    said apparatus includes at least one spring for biasing said plate toward said roller.

12. Apparatus according to claim 11, wherein:
    said plate has a frontal side located opposite to said rolling surface and engaging a movable part of said shock absorbing means.

* * * * *